(12) United States Patent
Yoshiike et al.

(10) Patent No.: US 11,640,203 B2
(45) Date of Patent: May 2, 2023

(54) OPERATION SYSTEM AND OPERATION METHOD

(71) Applicant: HONDA MOTOR CO., LTD., Tokyo (JP)

(72) Inventors: Takahide Yoshiike, Wako (JP); Christopher Garry, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/824,956

(22) Filed: May 26, 2022

(65) Prior Publication Data
US 2022/0391014 A1 Dec. 8, 2022

(30) Foreign Application Priority Data
Jun. 8, 2021 (JP) ................ JP2021-096184

(51) Int. Cl.
| | |
|---|---|
| *G09G 5/00* | (2006.01) |
| *G06F 3/01* | (2006.01) |
| *G06T 7/20* | (2017.01) |
| *H04B 17/10* | (2015.01) |
| *G06F 3/0484* | (2022.01) |

(52) U.S. Cl.
CPC ............ *G06F 3/014* (2013.01); *G06T 7/20* (2013.01); *H04B 17/104* (2015.01); *G06F 3/0484* (2013.01); *G06T 2200/24* (2013.01); *G06T 2207/20081* (2013.01)

(58) Field of Classification Search
CPC ..... G06F 3/014; G06F 3/0484; H04B 17/104; G06T 7/20; G06T 2200/24; G06T 2207/20081
USPC ........................................................ 345/156
See application file for complete search history.

(56) References Cited

U.S. PATENT DOCUMENTS

| | | | |
|---|---|---|---|
| 2013/0317648 A1* | 11/2013 | Assad ................... | A61B 5/389 700/258 |
| 2018/0239430 A1* | 8/2018 | Tadi ...................... | G06F 3/015 |
| 2020/0310540 A1* | 10/2020 | Hussami ................ | G06F 3/011 |

FOREIGN PATENT DOCUMENTS

JP 2001-054507 2/2001

* cited by examiner

*Primary Examiner* — Jennifer T Nguyen
(74) *Attorney, Agent, or Firm* — Amin, Turocy & Watson, LLP

(57) ABSTRACT

An operation system including: a prediction unit configured to determine a predicted value of a motion of an operator at a prediction time that is a time after elapse of a prediction time interval from the present using a predetermined machine learning model from a biomedical signal of the operator; a control unit configured to control a motion of a robot on the basis of the predicted value; and a prediction time setting unit configured to determine the prediction time interval on the basis of a delay time from a current value of the motion of the operator to the motion of the robot.

6 Claims, 10 Drawing Sheets

OPERATION SYSTEM AND OPERATION METHOD

CROSS-REFERENCE TO RELATED APPLICATION

Priority is claimed on Japanese Patent Application No. 2021-096184, filed Jun. 8, 2021, the content of which is incorporated herein by reference.

BACKGROUND OF THE INVENTION

Field of the Invention

The present invention relates to an operation system and an operation method.

Description of Related Art

Operation systems that accept an operator's motion and drive a robot in accordance with the accepted motion have been proposed. An operation system may be configured as a remote control system that delivers an operator's motion to a robot present at a remote place through communication. In such an operation system, a motion of the robot is delayed from an operator's motion due to a communication delay, a control delay, and the like. A motion of the robot is imaged using a camera or the like and is presented to the operator using a head-mounted display, a stationary monitor screen, or the like. Also at this time, a delay of a video occurs due to sampling at the time of imaging, a communication delay, and the like. The operator visually recognizes a presented image and determines a next motion. When a delay occurs in a motion perceived through visual recognition of an image, the operator should delay his or her operation. In such a case, the operation efficiency is lowered, and the operator cannot acquire a self-subject feeling for an operation of the robot.

SUMMARY OF THE INVENTION

However, also in a technique disclosed in Japanese Unexamined Patent Application, First Publication No. 2001-54507, a motion of a robot is delayed from a motion of an operator. When a motion speed of an operator is changed, a motion of a robot at a certain time point becomes different from a motion of the operator. This lowers the operation efficiency and may be a factor interfering with a self-subject feeling.

In accordance with an environment to which an operation system is applied or an operator's preference, a degree of a sense of incongruity and tolerance for a delay may be different.

An aspect of the present invention is in view of the points described above, and one object thereof is to provide an operation system and an operation method capable of improving the operability.

In order to achieve a related object by solving the problems described above, the present invention employs the following forms.

(1) According to one aspect of the present invention, there is provided an operation system including: a prediction unit configured to determine a predicted value of a motion of an operator at a prediction time that is a time after elapse of a prediction time interval from the present using a predetermined machine learning model from a biomedical signal of the operator; a control unit configured to control a motion of a robot on the basis of the predicted value; and a prediction time setting unit configured to determine the prediction time interval on the basis of a delay time from a current value of the motion of the operator to the motion of the robot.

(2) In the aspect (1) described above, the prediction time setting unit may detect the delay time using the current value of the motion and an image representing a motion environment of the robot.

(3) In the aspect (1) or (2) described above, an imaging unit configured to capture an image representing a motion environment of the robot may be further included.

(4) In the aspect (3) described above, the prediction time setting unit may detect a transmission delay relating to transmission from the prediction unit to the control unit and transmission from the imaging unit to the prediction time setting unit and determine the prediction time interval on the basis of the transmission delay.

(5) In any one of the aspects (1) to (4) described above, the prediction time setting unit may cause a display unit to display a setting screen of the prediction time interval and set the prediction time interval on the basis of an operation signal.

(6) In any one of the aspects (1) to (5) described above, an estimation unit configured to estimate a second motion of the operator on the basis of at least an image representing a motion environment of the robot and a motion signal representing the motion of the operator may be further included. The control unit may control the motion of the robot additionally on the basis of the second motion.

(7) In any one of the aspects (1) to (6) described above, a model learning unit configured to determine a parameter of the machine learning model such that a difference between the predicted value of the motion of the operator determined using the machine learning model from the biomedical signal delayed by a delay time from the biomedical signal to the motion of the operator and an actually-measured value of the motion of the operator is further decreased may be further included.

(8) According to one aspect of the present invention, there is provided an operation method used in an operation system, the operation method including: determining a predicted value of a motion of an operator at a prediction time that is a time after elapse of a prediction time interval from the present using a predetermined machine learning model from a biomedical signal of the operator; controlling a motion of a robot on the basis of the predicted value; and determining the prediction time interval on the basis of a delay time from a current value of the motion of the operator to the motion of the robot by using a prediction time setting unit.

According to the aspects (1) and (8) described above, the motion of the robot is controlled on the basis of the predicted value of the motion of the operator at a prediction time that is a time after elapse of a prediction time interval determined on the basis of a delay time from the motion of the operator to the motion of the robot. Since the time of the motion of the robot that is a control target can be adjusted in accordance with variations in the delay time, the variations in the delay time can be decreased or resolved. For this reason, the operability can be improved. Furthermore, the self-subject sense of the operation can be improved.

According to the aspect (2) described above, the motion of the robot is controlled on the basis of a delay time from a motion of the operator to a time when reflection of the motion in the motion of the robot is transferred to the operator. Since control based on the delay that can be actually sensed by the operator is performed, the operability of the robot can be improved.

According to the aspect (3) described above, even when the operator is present at a place isolated from the robot, the operator can control the motion while visually recognizing the motion environment of the robot.

According to the aspect (4) described above, the motion of the robot is controlled on the basis of the transmission delay relating to the transmission from the prediction unit to the control unit and the transmission from the imaging unit to the prediction time setting unit. By compensating for the transmission delay that may remarkably vary in accordance with a communication environment, traffic, and the like, the operability of the robot can be improved.

According to the aspect (5) described above, the operator can arbitrarily set the prediction time interval. For this reason, the motion of the robot can be controlled on the basis of a prediction time interval according to the preference of the operator and operation details.

According to the aspect (6) described above, a motion intended by the operator is estimated as a second motion from the motion of the operator and the motion environment of the robot. By supplementing the operation for the robot with the second motion, the intention of the operator is reflected in the motion of the robot. For this reason, the operability of the robot is further improved.

According to the aspect (7) described above, at a time preceding the prediction time, at which a motion based on a detected biomedical signal is acquired, by a time corresponding to the delay time, a predicted value of the motion can be acquired. For this reason, a timing for controlling the motion of the robot 20 can be adjusted on the basis of the prediction value of the motion in the range of the delay time.

DETAILED DESCRIPTION OF THE INVENTION

First Embodiment

Hereinafter, a first embodiment will be described with reference to the drawings.

Figure 1:
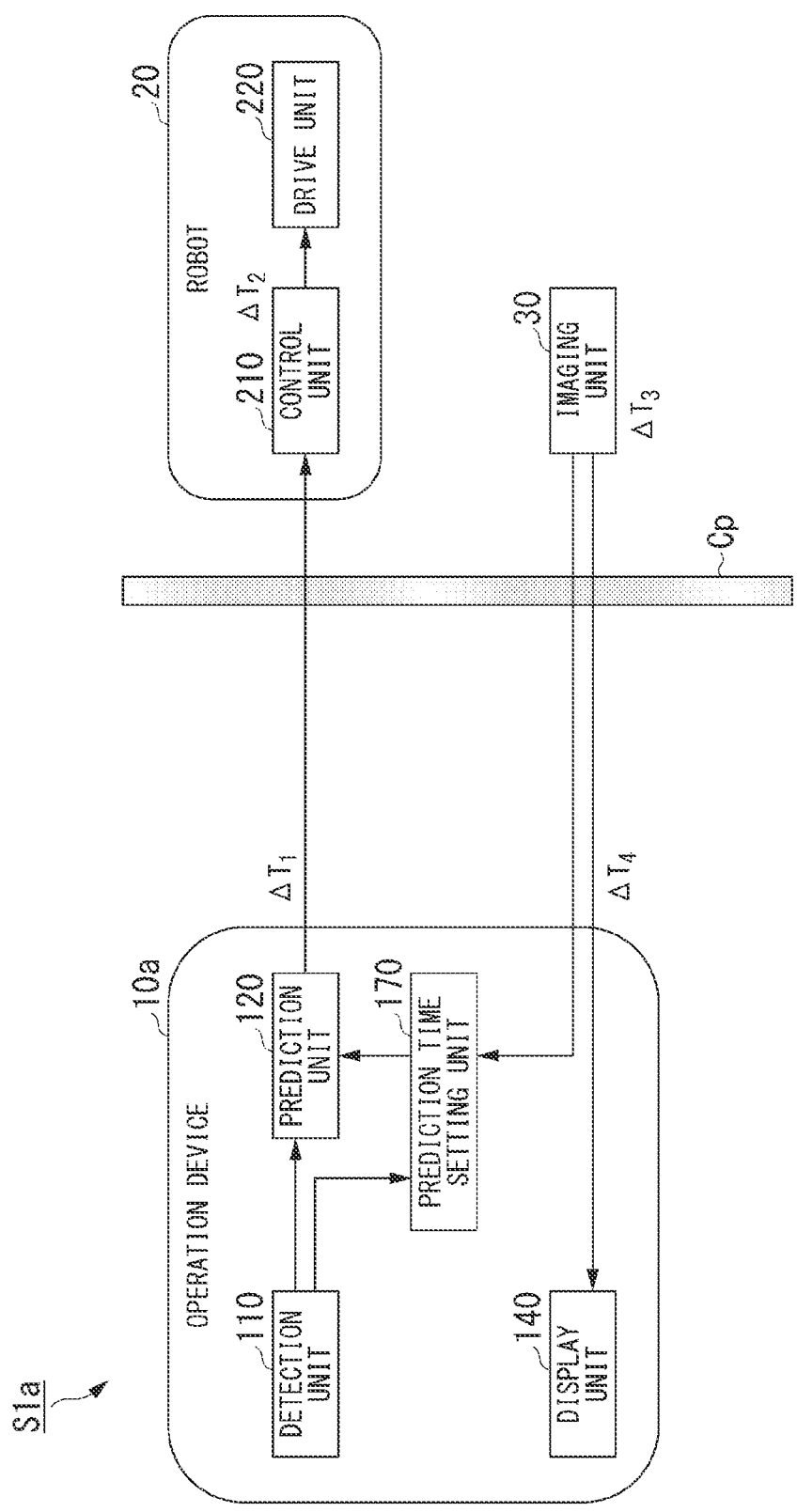
FIG. 1 is a schematic block diagram illustrating an example of the configuration of an operation system according to a first embodiment.

FIG. 1 is a schematic block diagram illustrating an example of the configuration of an operation system S1$a$ according to this embodiment. The operation system S1$a$ determines a predicted value of a motion of an operator at a prediction time on the basis of a biomedical signal of the operator using a predetermined machine learning model. The prediction time corresponds to a time after elapse of a predetermined prediction time interval from a time point (present). The operation system S1$a$ controls a motion of a robot 20 on the basis of a predicted value. An operator can operate a position and a shape of the robot 20 by performing a motion himself or herself. The operation system S1$a$ determines a prediction time interval on the basis of a delay time from a current value of a motion of an operator to a motion of a robot.

The operation system S1$a$ is configured to include an operation device 10$a$, a robot 20, and an imaging unit 30. The operation device 10$a$ and the robot 20 are connected via a transmission path $C_p$ such that they are able to transmit/receive various kinds of data to/from each other in a wireless or wired manner. The transmission path $C_p$ is not limited to a data bus (base line) and may be configured to include a communication network in a part or all thereof.

The imaging unit 30 captures an image representing the robot 20 within a visual field thereof and the vicinity of the robot. A motion environment of the robot 20 is represented in the image. The imaging unit 30 transmits image data representing a captured image to the operation device 10$a$ via the transmission path $C_p$. The imaging unit 30, for example, is a digital video camera.

The operation device 10$a$ directly or indirectly accepts a motion of an operator who is a user and provides a motion signal representing the accepted motion for the robot 20. The operation device 10$a$ detects a biomedical signal generated in an operator and generates a motion signal representing a predicted value of the operator at a prediction time on the basis of the detected biomedical signal. The operation device 10$a$ is configured to include a detection unit 110, a prediction unit 120, a display unit 140, and a prediction time setting unit 170.

The operation device 10$a$ has a mounting fixture enabling mounting on a human body and may be configured as a so-called wearable device. In the mounting fixture, a member forming the functional unit described above is installed. For example, the operation device 10$a$ includes a glove and a head band as the mounting fixture. The glove is configured to be able to be mounted on a hand part that is a part of a human body. The detection unit 110 is installed in the glove and is configured as a data glove. The number of data gloves may be one or two. Each data glove is used for an operation on a manipulator configuring the robot 20. The number of data gloves may be the same as the number of manipulators. The head band is configured to be able to be mounted on a head part that is a part of a human body. The head band is configured to be able to be mounted on a head part that is a part of a human body. The display unit 140 may be mounted in the head band and may be configured as a head mounted display (HMD).

The detection unit 110 includes a biomedical signal detecting unit that detects a biomedical signal generated in an operator. The detection unit 110 outputs the detected biomedical signal to the prediction unit 120. The detection unit 110, for example, acquires a myoelectric signal (electromyogram (EMG)) as a biomedical signal. The myoelectric signal represents a change of a myoelectric potential in an upper arm part and a hand part forming a part of a living body over time, in other words, a myoelectric potential for each time. The electromyogram corresponds to one form of a myoelectric signal. In this embodiment, the detection unit 110 is configured to include a surface electrode. By mounting the surface electrode on the surface of a living body, a myoelectric signal can be acquired noninvasively. The detection unit 110 may perform predetermined pre-processing on a detected myoelectric potential and output a myoelectric signal representing the myoelectric potential after processing to the prediction unit 120.

The detection unit 110 further includes a motion detecting unit that detects a motion of an operator. The detection unit 110 outputs a motion signal representing the detected motion to the prediction time setting unit 170. The detection unit 110, for example, includes an acceleration sensor that is used for detecting a position of each part of an operator. Parts that are detection targets include at least palms and joints of fingers as a plurality of parts. The plurality of parts may further include wrists. Each acceleration sensor may be installed in the data glove. When the data glove is mounted on a hand part of an operator, each acceleration sensor may be installed at a position in contact with a part that is a detection target of acceleration.

The detection unit 110 may include an imaging unit that captures an image of a body of an operator and a motion detecting unit that optically detects a position of each part of the operator using a captured image (motion capture) instead of the acceleration sensor. Here, a marker that reflects light having a component of a predetermined wavelength is attached to each part of the operator.

The prediction unit 120 predicts a motion of an operator at a prediction time, which is a time after a predetermined prediction time interval elapses from the present, as a predicted value using a predetermined machine learning model on the basis of a biomedical signal input from the detection unit 110. The motion is represented in a time series of postures for each time. The prediction unit 120 transmits a motion signal representing a predicted value that has been predicted to the robot 20. In this embodiment, the prediction time interval is changeable and is set by the prediction time setting unit 170. A maximum value of the prediction time interval is a delay time from generation of a biomedical signal in an operator to generation of a motion. This delay time may be called an electromechanical delay (EMD). A minimum value of the prediction time interval is 0.

As a motion of an operator, for example, a joint motion may be used. The joint motion is represented using an angle formed by two parts for each pair formed from the two parts connected to each other among a plurality of parts of a human body at each time on the basis of a muscle dynamics model. The muscle dynamics model is one type of a human body model that represents a posture or a motion of a human body. The plurality of parts include a wrist, a palm, and joints of fingers. A joint is a part that forms a part of a finger and is a part connected to another part at one end or both ends through a joint. As a motion of an operator, instead of a joint motion or together with a joint motion, a position of a part (for example, a wrist) that is a part in which each data glove is mounted or a center of gravity between parts may be included as a representative position. The machine learning model, for example, may be any kind of a mathematical model such as a neural network or a random forest as long as it is a mathematical model capable of estimating a motion from a biomedical signal.

Figure 2:
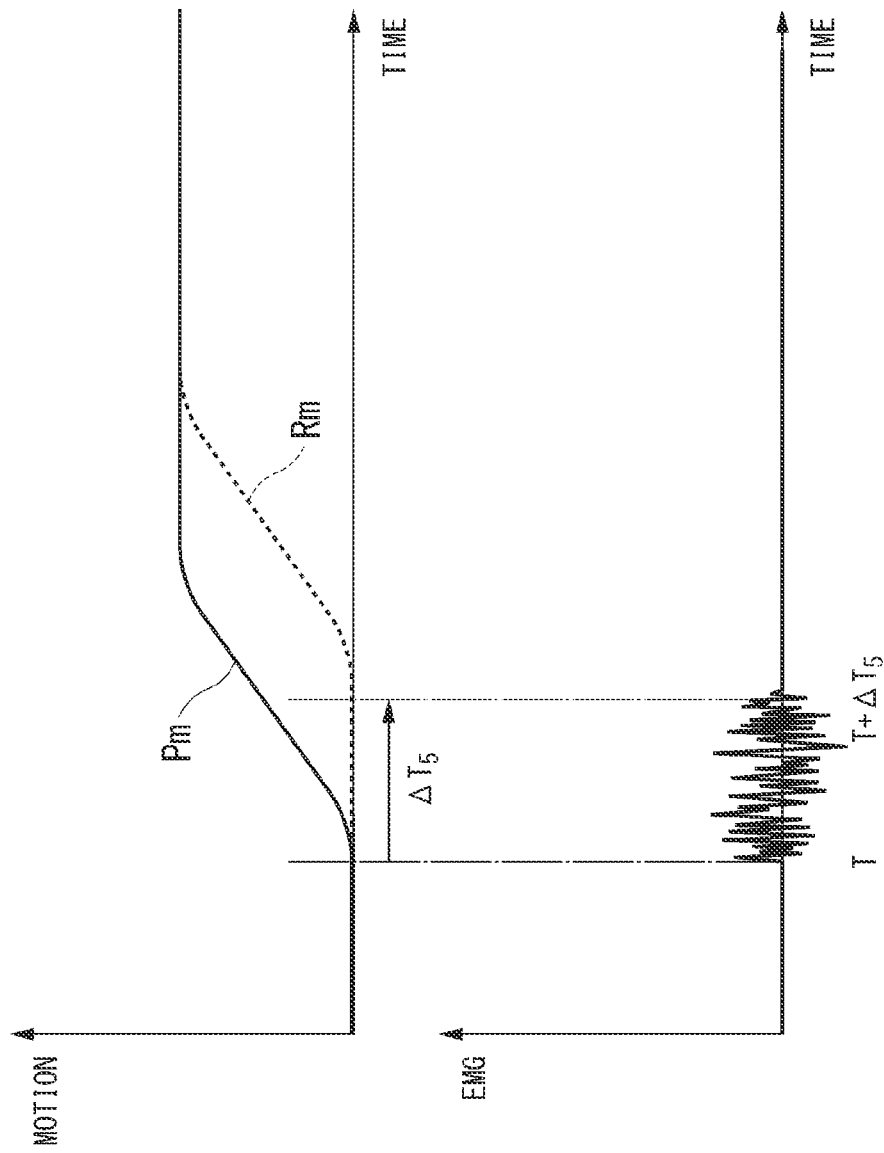
FIG. 2 is a diagram illustrating an example of an EMG and an operator motion.

Generally, a predetermined delay from generation (ignition) of a myoelectric potential to generation of a motion according to exhibition of a muscle tone occurs. A delay time relating to this delay corresponds to the EMD described above. In this description, this delay time may be referred to as a delay time $\Delta T_5$. In the example illustrated in FIG. 2, generation of a myoelectric potential starts at a time T in the EMG, and a motion starts from a time $T+\Delta T_5$ after elapse of the delay time $\Delta T_5$ (a curve Rm). As will be described below, by analyzing a biomedical signal, a motion (a curve Pm) can be predicted before an actual motion is generated. Typically, the delay time $\Delta T_5$ is about 100 ms to 300 ms.

The display unit 140 receives image data from the imaging unit 30. The display unit 140 includes a display that displays an image based on the received image data. By visually recognizing the image displayed by the display unit 140, an operator can check a motion status of the robot 20.

A motion signal is input from the detection unit 110 to the prediction time setting unit 170, and the prediction time setting unit 170 receives image data from the imaging unit 30. The prediction time setting unit 170 delays the motion signal, calculates a cross correlation between a motion (mainly from a wrist to a hand part) of an operator represented in the delayed motion signal and a motion of the robot 20 represented in image data for each delay time, and identifies a delay time giving a highest cross correlation. The prediction time setting unit 170 determines a prediction time interval by subtracting a predetermined offset time from the identified delay time. The offset time is set in advance such that the prediction time interval determined through subtraction from the delay time is equal to or larger than 0 and is equal to or smaller than the maximum value described above. In accordance with this, the prediction time interval is determined on the basis of a delay time from a motion of an operator to a time when the motion is reflected in a motion of the robot 20.

When a cross correlation is calculated, the prediction time setting unit 170 may normalize motions of an operator represented in a motion signal and motions of the robot 20 represented in image data. In normalization, the prediction time setting unit 170 models a motion of an operator represented in a motion signal and a motion of the robot 20 represented in image data as joint motions using a predetermined human body model (for example, a muscle dynamics model). A motion is a time series of postures at respective times. According to the muscle dynamics model, a posture is represented by a plurality of parts (or members) and an angle formed by two parts for each pair of parts formed from two parts connected to each other. The prediction time setting unit 170 sets the determined prediction time interval in the prediction unit 120. The prediction unit 120 uses the set prediction time interval for estimating a predicted value of a motion or an operator.

The robot 20 performs a motion on the basis of a motion signal provided from the operation device 10a. The robot 20 is configured to include a plurality of members, includes an actuator that can change an angle between two members adjacent to each other (in description here, they may be referred to as a "member pair), and changes a position and a posture of the robot 20 as a whole. The actuator is installed for each joint that connects two members. The robot 20 reproduces a motion corresponding to a motion of an operator represented in the provided motion signal. The robot 20 may be either a single-arm robot having one manipulator or a two-arm robot having two manipulators. Each manipulator includes one robot arm and one end effector. The end effector is also called a robot hand. For example, a case in which the robot 20 is a two-arm robot, and an operator stretches his or her right arm ahead will be assumed. In this case, the robot 20 causes a robot arm to perform a motion such that an end effector corresponding to the right hand of the operator moves forward. In a case in which the operator holds his or her left hand, the robot 20 transforms a plurality of finger parts forming an end effector corresponding to the left hand of the operator such that tip ends thereof face each other.

The robot 20 is configured to include a control unit 210 and a drive unit 220.

The control unit 210 controls the motion of the robot 20 on the basis of a motion signal provided from the operation device 10a. The control unit 210, for example, performs control of positions and postures of members forming the robot 20 such that end effectors move in accordance with a motion represented in a motion signal. More specifically, the control unit 210, for example, transforms a representative position of an operator represented in a motion signal into a position corresponding thereof in a robot coordinate system and sets as a target value of the position of the end effector. The control unit 210 may set positions in a robot coordinate system corresponding to positions of individual parts represented in a joint motion as target values of positions of the members of the robot 20 that correspond to the parts. By solving a known inverse kinematic problem, the control unit 210 determines an angle formed for each member pair in a period in which an end effector or a member thereof reaches a target position as a target value. The control unit 210 outputs a control signal representing the determined target value to the drive unit 220.

The drive unit 220 is configured to include an actuator and a controller for each member pair. The controller drives the actuator such that a current value of an angle formed by the member pair at that time point approaches a target value of the angle represented in a control signal. The controller may use any technique as long as the technique performs control such that a residual between the current value and the target value decreases. The controller, for example, may be any one of a PID controller, a PD controller, and the like.

The control unit 210 may set a torque as a target value for each member pair. In such a case, the controller forming the drive unit 220 drives the actuator such that the current value of the torque applied to the member pair at that time point approaches the target value of the angle represented in the control signal.

In the example illustrated in FIG. 1, in a delay until an operator motion, the motion is reflected in a motion of the robot 20, and an image representing the motion of the robot 20 is displayed on the display unit 140, there are the following factors.

(1) Transmission delay (communication delay) $\Delta T_1$: A transmission delay $\Delta T_1$ is a time interval until a motion signal representing a motion of an operator is transferred from the prediction unit 120 to the control unit 210. In a conventional method, the detection unit 110 acquires a motion signal representing a motion of an operator and provides the acquired motion signal for the robot 20.

Figure 9:
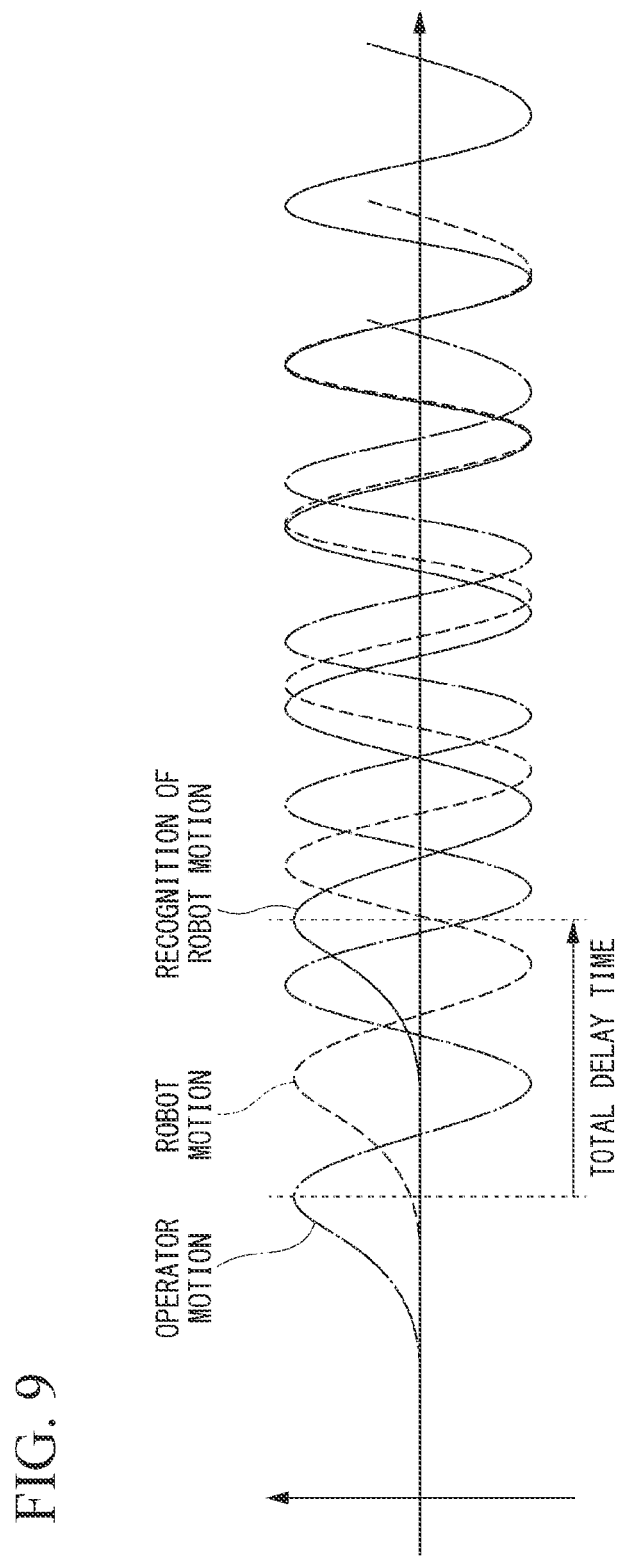
FIG. 9 is a diagram illustrating an example of a biomedical signal, an operator motion, and perception of a robot motion.

(2) Control delay $\Delta T_2$: A control delay $\Delta T_2$ is a time interval until a motion signal is reflected in a motion of the robot 20 from acquisition of the motion signal. In the example illustrated in FIG. 9, a time interval from a motion of an operator to a motion of a robot corresponds to a sum value of the transmission delay $\Delta T_1$ and the control delay $\Delta T_2$.

(3) Monitoring delay $\Delta T_3$: A monitoring delay $\Delta T_3$ is a time interval until an image representing a motion of the robot 20 is captured by the imaging unit 30, and image data representing the captured image is generated.

(4) Transmission delay $\Delta T_4$: A transmission delay $\Delta T_4$ is a time interval until image data is transferred from the imaging unit 30 to the display unit 140. In the example illustrated in FIG. 9, a time interval from a motion of a robot to recognition of the motion of the robot corresponds to a sum value of the monitoring delay $\Delta T_3$ and the transmission delay $\Delta T_4$. Thus, as in the conventional method, in a case in which the operation device 10a acquires a motion signal representing a motion of an operator, a total delay time $\Sigma T$ becomes such a total sum thereof $\Delta T_1 + \Delta T_2 + \Delta T_3 + \Delta T_4$.

Figure 10:
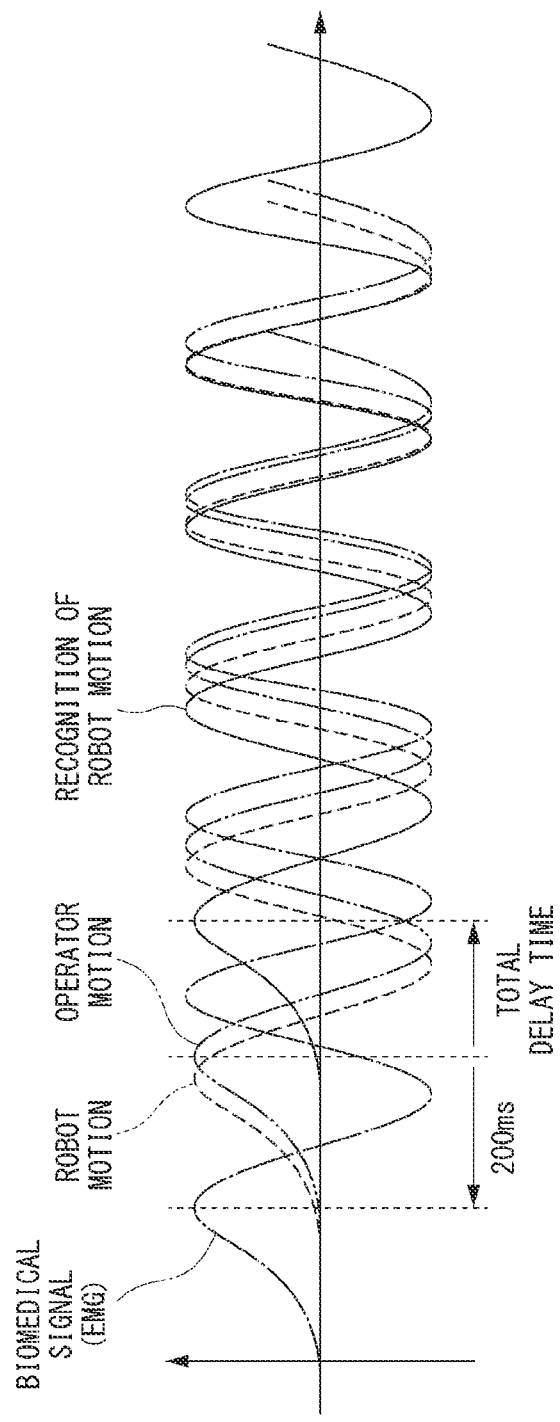
FIG. 10 is a diagram illustrating another example of a biomedical signal, an operator motion, and perception of a robot motion.

In contrast to this, in this embodiment, the prediction unit 120 predicts a motion after a prediction time interval $\Delta T_p$ from a time point using a biomedical signal detected by the detection unit 110 and provides a motion signal representing the predicted motion for the robot 20. For this reason, a delay time until a motion of the robot is recognized by the operator after an operation is reflected in the motion of the robot is offset by the prediction time interval $\Delta T_p$. In the example illustrated in FIG. 10, a period from a motion of an operator predicted from the EMG as a biomedical signal to a motion of a robot corresponds to a time interval $\Delta T_1 + \Delta T_2 - \Delta T_p$ that is acquired by subtracting the prediction time interval $\Delta T_p$ from a sum value of the transmission delay $\Delta T_1$ and the control delay $\Delta T_2$. A maximum value of the prediction time interval $\Delta T_p$ is a delay time $\Delta T_5$ (EMD). Here, as an example, the prediction time interval $\Delta T_p$ is set to 200 ms. Thus, the total delay time $\Sigma T$ decreases to a time interval $\Delta T_1 + \Delta T_2 + \Delta T_3 + \Delta T_4 - \Delta T_p$ that is acquired by subtracting the prediction time interval $\Delta T_p$ from the total delay time according to the conventional method. The total delay time is maintained to be constant regardless of variations in the delay time according to other factors. For this reason, the operability according to the operator is improved, and the self-subject feeling for the motion of the robot 20 can be improved.

Second Embodiment

Next, a second embodiment will be described mainly focusing on different points from the embodiment described above. The same reference signs will be assigned to processes and configurations common to those of the embodiment described above, and the description thereof will be cited unless mentioned otherwise.

Figure 3:
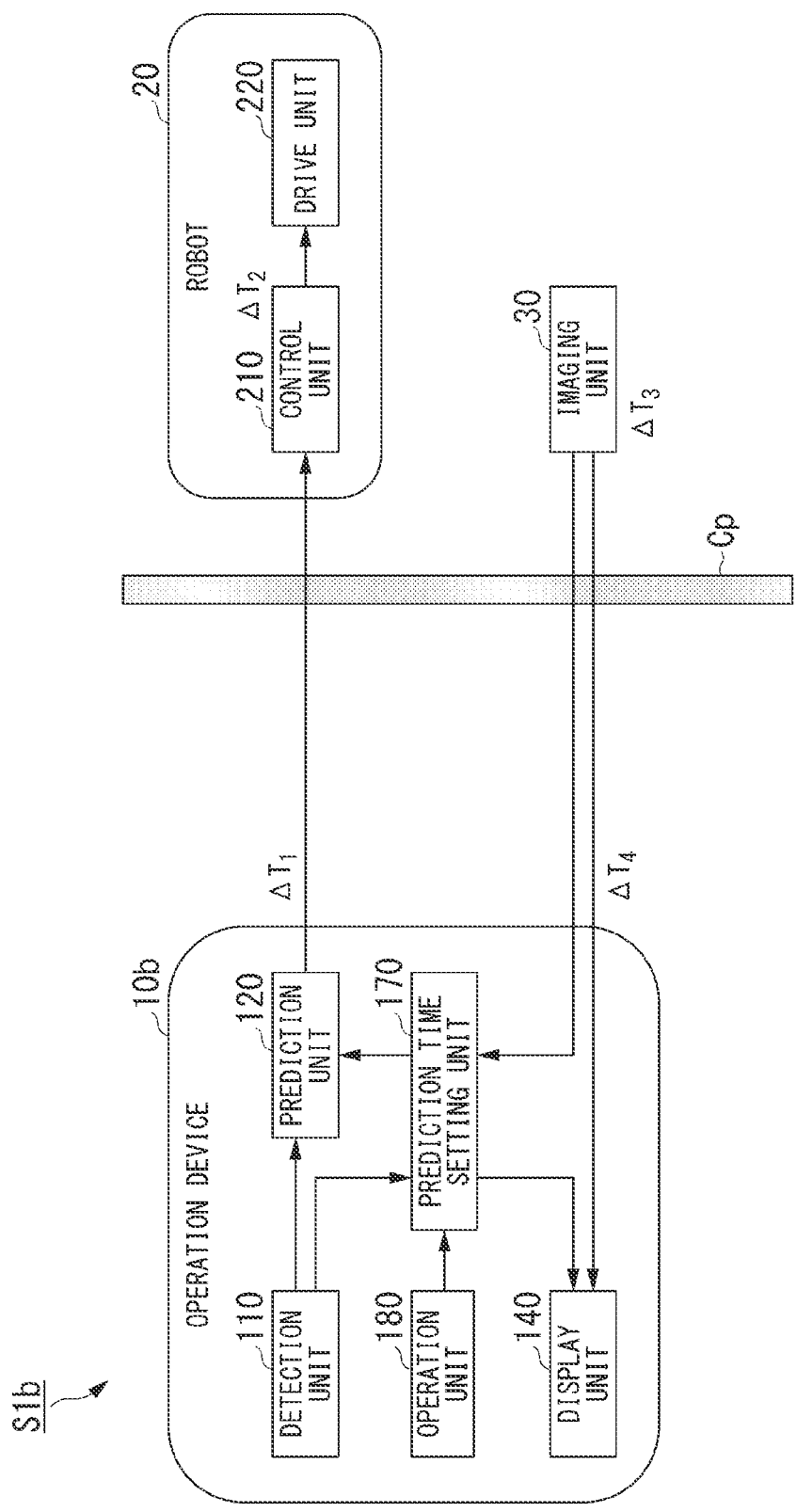
FIG. 3 is a schematic block diagram illustrating an example of the configuration of an operation system according to a second embodiment.

FIG. 3 is a schematic block diagram illustrating an example of the configuration of an operation system S1b according to this embodiment. The operation system S1b is configured to include an operation device 10b, a robot 20, and an imaging unit 30. The operation device 10b is configured to include a detection unit 110, a prediction unit 120, a display unit 140, a prediction time setting unit 170, and an operation unit 180.

The prediction time setting unit 170 causes the display unit 140 to display a setting screen of a prediction time interval and determines the prediction time interval on the basis of an operation signal input from the operation unit 180. More specifically, the prediction time setting unit 170 reads setting screen data representing a setting screen set therein in advance and outputs the read setting screen data to the display unit 140. The display unit 140 displays a setting screen (not illustrated) based on setting screen data input from the prediction time setting unit 170. In other words, a user interface (UI) for setting a prediction time interval is realized by the prediction time setting unit 170, the display unit 140, and the operation unit 180.

The setting screen is configured to include a prediction time interval setting field. The prediction time setting unit 170 displays a prediction time interval set at that time point. After the setting field is instructed in accordance with an operation signal input from the operation unit 180, the prediction time setting unit 170 displays a numerical value instructed in accordance with the operation signal in the setting field and determines the instructed numerical value as a prediction time interval. The prediction time setting unit 170 outputs the determined prediction time interval to the prediction unit 120.

The operation unit 180 accepts an operation according to an operator who is a user, generates an operation signal according to the accepted operation, and outputs the generated operation signal to the prediction time setting unit 170. The operation unit 180, mainly, accepts an operation on the operation device 10b. The operation unit 180, for example, may be configured to include dedicated members such as a button, a lever, a latch, and the like or may be configured to include general-purpose members such as a touch sensor, a mouse, and the like. The operation unit 180, for example, may be installed in a part of a head-mounted display.

Thus, an operator can set a desired prediction time interval through an operation in accordance with a preference for the prediction time interval, operation details for the robot 20, and the like. For this reason, the operability of the robot 20 can be improved.

Third Embodiment

Next, a third embodiment will be described mainly focusing on different points from the embodiment described above. The same reference signs will be assigned to processes and configurations common to those of the embodiment described above, and the description thereof will be cited unless mentioned otherwise.

Figure 4:
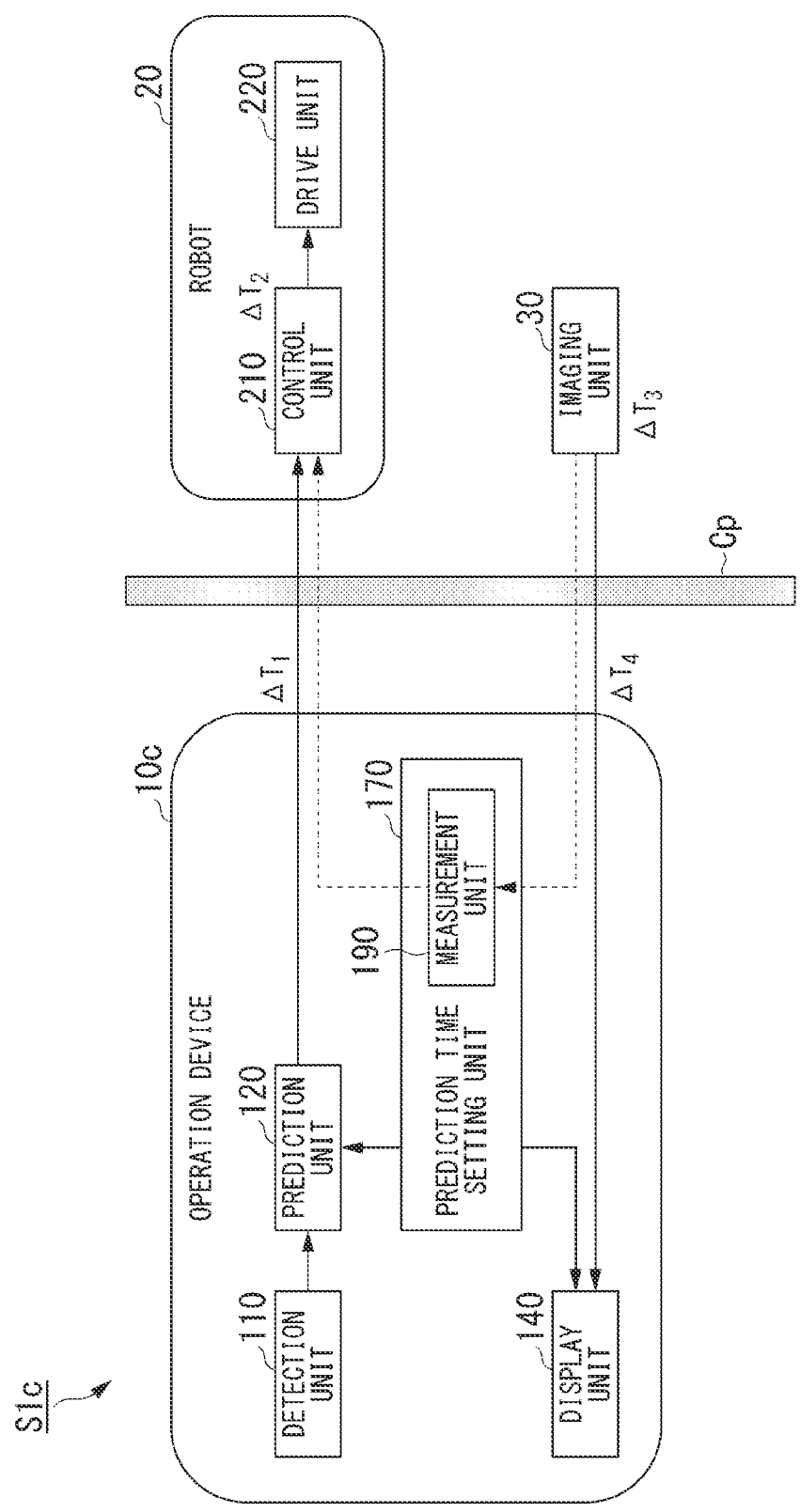
FIG. 4 is a schematic block diagram illustrating an example of the configuration of an operation system according to a third embodiment.

FIG. 4 is a schematic block diagram illustrating an example of the configuration of an operation system S1c according to this embodiment. The operation system S1c is configured to include an operation device 10c, a robot 20, and an imaging unit 30. The operation device 10c is configured to include a detection unit 110, a prediction unit 120, a display unit 140, and a prediction time setting unit 170. The prediction time setting unit 170 includes a measurement unit 190.

The measurement unit 190 measures a transmission delay $\Delta T_1$ from the prediction unit 120 to the control unit 210 and a transmission delay $\Delta T_4'$ from the imaging unit 30 to the prediction time setting unit 170. The transmission delay $\Delta T_4'$ is approximately the same as the transmission delay $\Delta T_4$ from the imaging unit 30 to the display unit 140. The prediction time setting unit 170 calculates a sum $\Delta T_1+\Delta T_4'$ of the transmission delay $\Delta T_1$ and the transmission delay $\Delta T_4'$ that have been measured as a total transmission delay and determines a prediction time interval by subtracting a predetermined second offset value from the calculated total transmission delay. The prediction time setting unit 170 sets the determined prediction time interval in the prediction unit 120. Here, the second offset is set in advance such that a prediction time interval acquired by subtracting the second offset value from the total transmission delay is equal to or larger than 0 and equal to or smaller than the maximum value described above. In accordance with this, a transmission delay that may meaningfully vary in accordance with a communication environment and traffic of the transmission path $C_p$ is compensated. For this reason, the operability can be improved regardless of the transmission delay.

The measurement unit 190 can measure the transmission delay $\Delta T_1$ and the transmission delay $\Delta T_4'$ using a predetermined communication protocol (for example, an internet control message protocol (ICMP) or the like). For example, the measurement unit 190 transmits a predetermined test signal to the control unit 210 through the prediction unit 120 and measures a time interval until the test signal is received from the control unit 210 through the prediction unit 120 as a first round trip delay time. The measurement unit 190 can determine a transmission delay $\Delta T_1$ by dividing the first round trip delay time by 2. The measurement unit 190 transmits a predetermined test signal to the imaging unit 30 and measures a time interval until the test signal is received from the imaging unit 30 as a second round trip delay time. The measurement unit 190 can determine a transmission delay $\Delta T_4'$ by dividing the second round trip delay time by 2.

Fourth Embodiment

Next, a fourth embodiment will be described mainly focusing on different points from the embodiment described above. The same reference signs will be assigned to processes and configurations common to those of the embodiment described above, and the description thereof will be cited unless mentioned otherwise.

FIG. 4 is a schematic block diagram illustrating an example of the configuration of an operation system S1d according to this embodiment. The operation system S1d is configured to include an operation device 10d, a robot 20, and an imaging unit 30. The operation device 10d is configured to include a detection unit 110, a prediction unit 120, a display unit 140, an estimation unit 150, an integration unit 160, and a prediction time setting unit 170.

The detection unit 110 outputs a motion signal representing a detected motion of an operator to the estimation unit 150. A motion signal is input to the estimation unit 150 from the detection unit 110, and image data is input to the estimation unit 150 from the imaging unit 30. The estimation unit 150 estimates a second motion that can be performed by an operator on the basis of the motion signal and the image data (intention estimation). The second motion is a motion of which a possibility of being intended by an operator is higher than those of other motions under a motion environment of the robot 20 represented in the image data. The second motion is a motion that is more delicate than a global motion (for example, movement of a hand part) mainly estimated by the prediction unit 120. In the second motion, for example, motions of individual fingers, fine adjustment of one or both of a position and a direction of a hand part, and the like are included. The estimation unit 150 outputs a second motion signal representing the estimated second motion to the integration unit 160.

The estimation unit 150, for example, estimates a motion of causing tip ends of individual fingers to face each other as a second motion when image data representing a status in which the end effector of the robot 20 enters an area neighboring to an object more than the size thereof and a motion signal representing start of motions of a plurality of fingers are input. In such a status, there is a possibility of the operator causing the end effector to grip the object by holding his or her hand. The estimation unit 150, for example, estimates a motion of the tip ends of individual fingers moving backward as a second motion when image data representing a status in which the end effector of the robot 20 is gripping an object placed on a table and a motion signal representing start of motions of a plurality of fingers are input. In such a status, there is a high possibility of the operator causing the end effector to release the gripped object by widening his or her fingers.

The detection unit 110 may detect a visual line direction of the operator. The detection unit 110 outputs visual line information representing the detected visual line direction to the prediction unit 120. The detection unit 110, for example, includes a visual line detecting unit (an eye tracker) used for detecting a visual line direction of an operator. The visual line detecting unit, for example, may be mounted in a head-mounted display. The visual line detecting unit may be installed at a part at which an image of pupils of both eyes that is a target for detecting a visual line can be acquired when a head mounted display is mounted in a head part of the operator.

The detection unit 110 may further include an acceleration sensor used for detecting a direction and a position of a head part of an operator. The detection unit 110 outputs operator position information that represents the direction and the position that have been detected to the prediction unit 120. The detection unit 110, for example, includes a 6-axial acceleration sensor used for detecting a direction and a position of a head part of an operator. The 6-axial acceleration sensor detects accelerations of three directions orthogonal to each other in a three dimensional space and axial accelerations of the three directions. The detection unit 110 can determine a direction by performing second-order integration of the detected axial accelerations of the three directions. The detection unit 110 can determine a position by performing second-order integration of the detected accelerations of the three directions. The acceleration sensor may be installed at a position that is in contact with a frontal plane of a head part that is a target for detecting accelerations or axial accelerations when the head mounted display is mounted in the head part of the operator.

The estimation unit 150 may determine a second motion by further using visual line information input from the detection unit 110. The estimation unit 150 estimates a visual line direction represented in the visual line information as a direction of interest. The direction of interest means a direction in which an operator is interested. The estimation unit 150 can transform the visual line direction represented in the visual line information into a direction in a robot environment coordinate system having the position and the direction of the imaging unit 30 as references on the basis of the operator position information input from the detection unit 110 and the position, the direction, and the visual field of the imaging unit 30 and determine the transformed direction as the direction of interest. In a case in which images of a plurality of objects are included in an image represented in the image data, the estimation unit 150 can determine an object of which the image appears in the direction of interest among the plurality of objects as an object of interest. The estimation unit 150 determines a second motion on the basis of the motion signal, the image data, and the object of interest and may ignore objects other than the object of interest. In accordance with this, useless estimation of a second motion on an object, which is not intended by an operator, other than the object of interest is avoided.

For example, second motion data representing a relation between image data and a motion signal set as input information and a second motion set as output information is set in the estimation unit 150 in advance. The estimation unit 150 can determine a second motion corresponding to input information input thereto by referring to the second motion data. A parameter set used for estimating a second motion as output information from image data and a motion signal set as input information by using the second machine learning model may be set in advance in the estimation unit 150. The estimation unit 150 may determine a second motion on the basis of input information using the second machine learning model under the set parameter set. Visual line information may be further included in the input information.

The prediction unit 120 outputs a motion signal representing a predicted value predicted thereby to the integration unit 160 instead of the robot 20.

A motion signal is input from the prediction unit 120 to the integration unit 160, and the second motion signal is input from the estimation unit 150 to the integration unit 160. The integration unit 160 configures an integrated motion by integrating a first motion that is a motion represented by a motion signal and a second motion represented by a second motion signal. As long as the first motion and the second motion match each other without causing any contradiction, the integrated motion is represented as a joint motion. The integration unit 160 outputs a motion signal representing the configured integrated motion to the robot 20.

In a case in which a contradiction occurs between the first motion and the second motion or in a case in which a bad influence is predicted in accordance with execution of the first motion and the second motion, the integration unit 160 may select one thereof and discard the other. For example, in a case in which movement of an operator's hand represented by the first motion corresponds to movement toward an object in a direction in which the end effector gripping the object is further away from the table, and the second motion is a motion of moving the tip ends of fingers backward (corresponding to release of the object from a gripped state), the integration unit 160 may select the first motion and discard the second motion. In such a case, when the end effector becomes further away from the table while gripping the object, the object is avoided from being fallen in accordance with the second motion. In a case in which the first motion represents start of movement of a hand that is in a stop state (corresponding to start of movement of the end effector), and the second motion represents being in the middle of a motion of causing tip ends of fingers to face each other (corresponding to the procedure of gripping the object), the integration unit 160 may discard the first motion and prioritize the second motion. In such a case, the object is avoided from moving in a state in which gripping of the object using the end effector has not been completed.

For example, selection data representing requirement of selection/no-requirement of selection may be set in the integration unit 160 for each of the first motion and the second motion in advance. The integration unit 160 identifies requirement/non-requirement of each of the first motion and the second motion by referring to the selection data. When each of the first motion and the second motion is identified to be required, the integration unit 160 generates a motion signal representing an integrated motion acquired by integrating the first motion and the second motion and outputs the generated motion signal to the robot 20. When one of the first motion and the second motion is identified to be required, and the other motion is identified not to be required, the integration unit 160 generates a motion signal representing one motion and outputs the generated motion signal to the robot 20. When none of the first motion and the second motion is identified to be required, the integration unit 160 does not generate a motion signal representing any one of the motions.

The control unit 210 of the robot 20 controls the motion of the robot 20 on the basis of a motion signal provided from the operation device 10b. A motion signal representing an integrated motion may be input to the control unit 210. In such a case, the control unit 210 is instructed to perform a motion acquired by combining a motion estimated in accordance with a biomedical signal and a second motion estimated in accordance with a motion environment, and the drive unit 220 is instructed to perform such a motion. For example, a global motion is instructed as the estimated motion, and a delicate motion is instructed as the second motion. For example, as the global motion, there are a translation of a wrist having a relatively high movement speed and the like. As the second motion, there are positioning of individual finger parts with an object, gripping of an object, release of an object from a gripped state, and the like. For this reason, an operator can give an instruction for a more delicate motion according to the intention of the operator in the motion environment of the robot 20.

(Model Learning)

Figure 6:
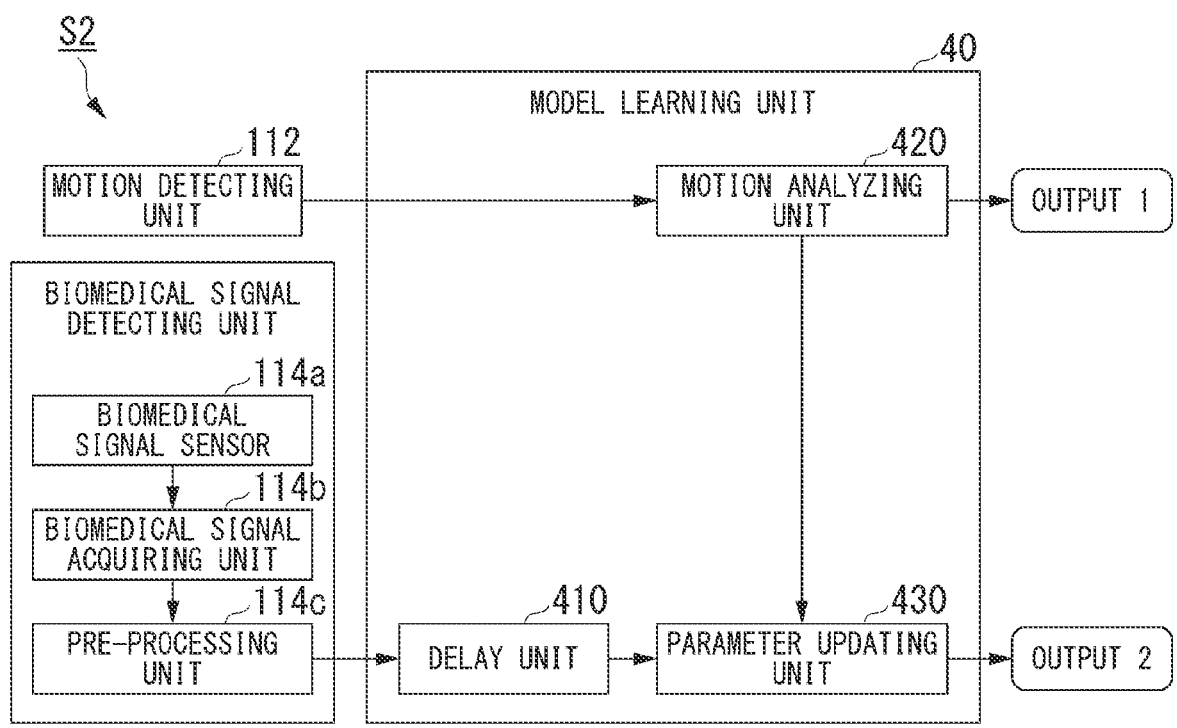
FIG. 6 is a schematic block diagram illustrating an example of the configuration of a model learning system.

Next, learning of a machine learning model will be described. FIG. 6 is a schematic block diagram illustrating an example of the configuration of a model learning system S2. The model learning system S2 is a system used for performing learning of a machine learning model used by the prediction unit 120. The machine learning model may be learned such that a motion signal representing a motion at a prediction time, which is after elapse of a prediction time interval from the present, is currently output for a biomedical signal input to the prediction unit 120 and the set prediction time interval.

The model learning system S2 is configured to include a motion detecting unit 112, a biomedical signal detecting unit 114, and a model learning unit 40. The motion detecting unit 112 detects a motion of a human body. The biomedical signal detecting unit 114 detects a biomedical signal generated in a human body. Although a human body that is a target for detecting a motion may be a body of a person other than the operator, it is preferable that the human body is a body of the operator. The model learning unit 40 determines a parameter set of the machine learning model such that the magnitude of a difference between a motion (output 2) estimated using the machine learning model on the basis of the detected biomedical signal and a detected motion (output 1) is further decreased (is minimized). By employing this configuration, the model learning unit 40 learns a machine learning model (supervised learning (supervised training)) using training data (supervised data) including a plurality of data pairs formed from a known biomedical signal and a motion signal.

Similar to the detection unit 110 described above, the motion detecting unit 112 detects a motion of a human body. For example, the motion detecting unit 112 includes an imaging unit that captures an image representing a physique of an operator and a motion analyzing unit that optically detects a position of each part of the operator using the image captured by the imaging unit. The motion detecting unit 112 outputs a motion signal representing a detected motion of a human body to the model learning unit 40.

Similar to the detection unit 110 described above, the biomedical signal detecting unit 114 detects a biomedical signal generated in a human body. For example, the biomedical signal detecting unit 114 includes a biomedical signal sensing unit 114a, a biomedical signal acquiring unit 114b, and a pre-processing unit 114c.

The biomedical signal sensing unit 114a is installed in or placed near a predetermined part of a human body and senses a biomedical signal generated in the part. For example, the biomedical signal sensing unit 114a corresponds to the surface electrode described above.

The biomedical signal acquiring unit 114b acquires a biomedical signal sensed by the biomedical signal sensing unit 114a. The biomedical signal acquiring unit 114b outputs the acquired biomedical signal to the pre-processing unit 114c. For example, the biomedical signal acquiring unit 114b is an EMG capture. For example, the EMG capture amplifies an electric potential generated in the biomedical signal sensing unit 114a and acquires a biomedical signal representing the amplified electric potential.

The pre-processing unit 114c performs pre-processing on a biomedical signal input from the biomedical signal acquiring unit 114b and outputs a biomedical signal after processing that is acquired through the pre-processing to the model learning unit 40. The pre-processing, for example, includes one or both of rectification and filtering. The rectification is a process in which, when an electric potential at each time is equal to or higher than a predetermined threshold of the electric potential (for example, 0 V), the electric potential is set as the electric potential of a biomedical signal after processing, and, when an electric potential at each time is lower than the predetermined threshold of the electric potential, the threshold is set as the electric potential of the biomedical signal after processing. The filtering is a process in which a component of a meaningful frequency band set in advance is maintained as a biomedical signal, and components of the other frequency bands are suppressed or eliminated. In accordance with this, noise mixed into the biomedical signal is eliminated.

The model learning unit 40 is configured to include a delay unit 410, a motion analyzing unit 420, and a parameter updating unit 430.

The delay unit 410 delays a biomedical signal input from the biomedical signal detecting unit 114 by a predetermined amount of delay (for example, 200 ms) set in advance. The delay unit 410 outputs the delayed biomedical signal to the parameter updating unit 430. The predetermined amount of delay may be a delay time $\Delta T_5$ from generation of a biomedical signal to generation of a motion, that is, an EMD. As this delay, a maximum value of the prediction time interval that can be controlled is assigned.

The motion analyzing unit 420 analyzes a motion represented in a motion signal input from the motion detecting unit 112 on the basis of a known muscle dynamics model and outputs a motion signal representing the analyzed motion to the parameter updating unit 430. The motion analyzing unit 420, for example, identifies a position of each of a plurality of parts configuring a human body on the basis of an input motion signal and determines an angle formed by two parts for each pair formed from two parts connected to each other. The motion analyzing unit 420 can generate a motion signal that represents the determined angle.

The parameter updating unit 430 regressively updates the parameter set of a machine learning model using a biomedical signal input from the delay unit 410 as input information such that the magnitude of a difference between an estimated value of a motion of a human body estimated as output information using the predetermined machine learning model and an observed value of a human body represented in a motion signal input from the motion analyzing unit 420 further decreases. The observed value and the estimated value respectively correspond to the output 1 and the output 2 illustrated in the drawing. A loss function representing the magnitude of a difference between an observed value and an estimated value, for example, may be any one of a sum of squared differences (SSD), a cross entropy, and the like.

The parameter updating unit 430 may repeat the update of the parameter set to be updated a predetermined number of times set in advance or may repeat the update until the parameter set converges at a predetermined value. The parameter updating unit 430, for example, can determine whether or not the parameter set has converged on the basis of whether or not the magnitude of a difference between values before and after update of some or all of parameters configuring the parameter set is equal to or smaller than a predetermined threshold of the magnitude. The parameter updating unit 430 sets the parameter set determined through update in the prediction unit 120 described above. The machine learning model used by the parameter updating unit 430 may be a mathematical model of the same kind as that of the machine learning model used by the prediction unit 120. By delaying an input biomedical signal by a set prediction time interval and inputting the delayed biomedical signal to the machine learning model, the prediction unit 120 can acquire a motion signal representing a motion at a prediction time that is after elapse of a prediction time interval from the present from the machine learning model.

As the motion detecting unit 112 and the biomedical signal detecting unit 114, the detection unit 110 described above may be used, or the motion detecting unit 112 and the biomedical signal detecting unit 114 may be disposed in addition to the detection unit 110. The model learning unit 40 may be included in any one or all of the operation systems S1a to S1d or may be realized by a device that is independent from all the operation systems S1a to S1d.

In a case in which the model learning unit 40 is included in any one or all of the operation systems S1a to S1d, during an operation on the robot 20, the model parameter of the machine learning model may be updated (online learning) using a biomedical signal and a motion signal input from the detection unit 110. In accordance with this, a motion prediction value estimated on the basis of a biomedical signal is corrected to be close to a predicted value of the current motion, and thus the prediction accuracy of the motion signal can be further improved.

(Machine Learning Model)

Figure 5:
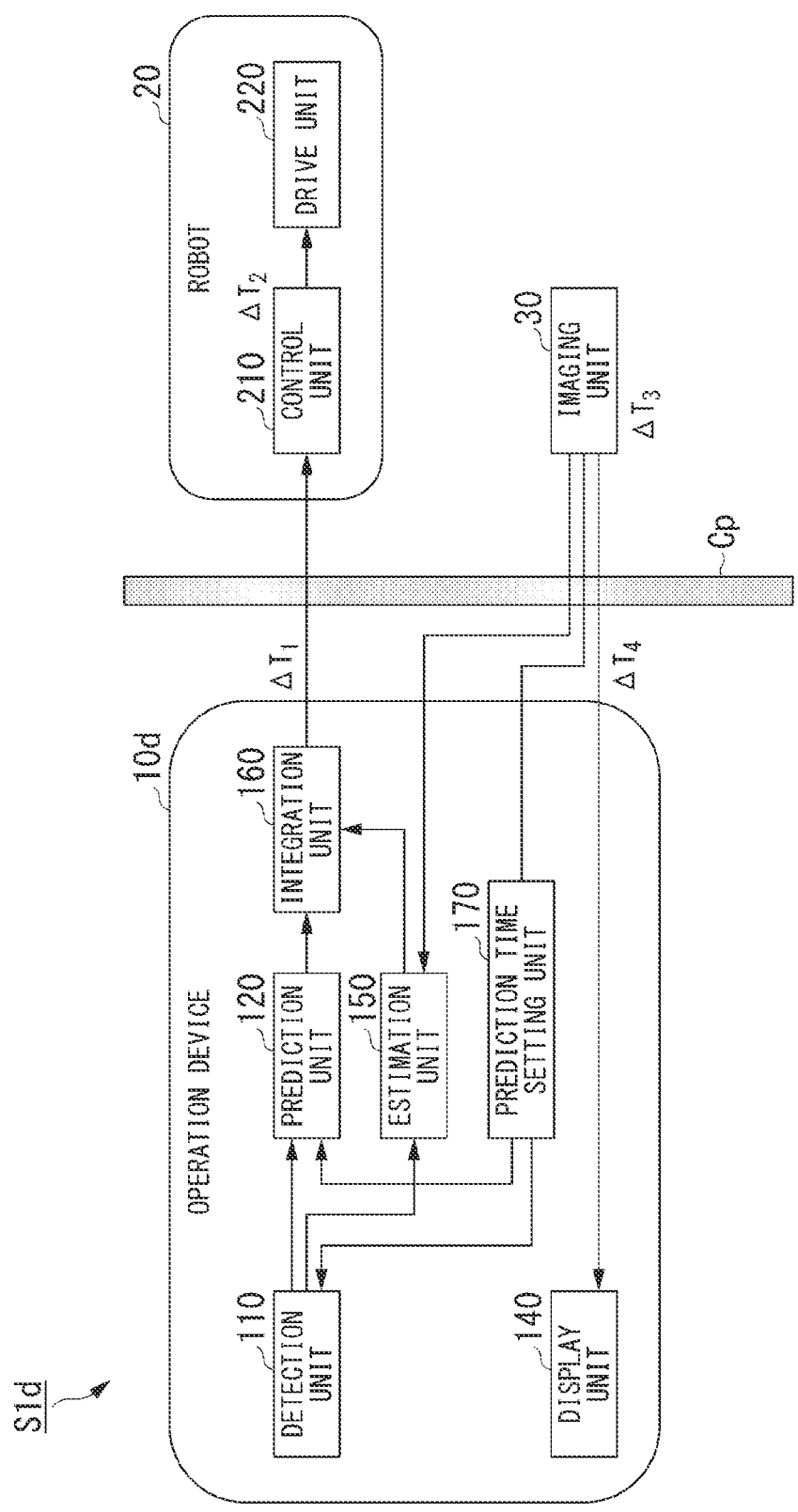
FIG. 5 is a schematic block diagram illustrating an example of the configuration of an operation system according to a fourth embodiment.
Figure 7:
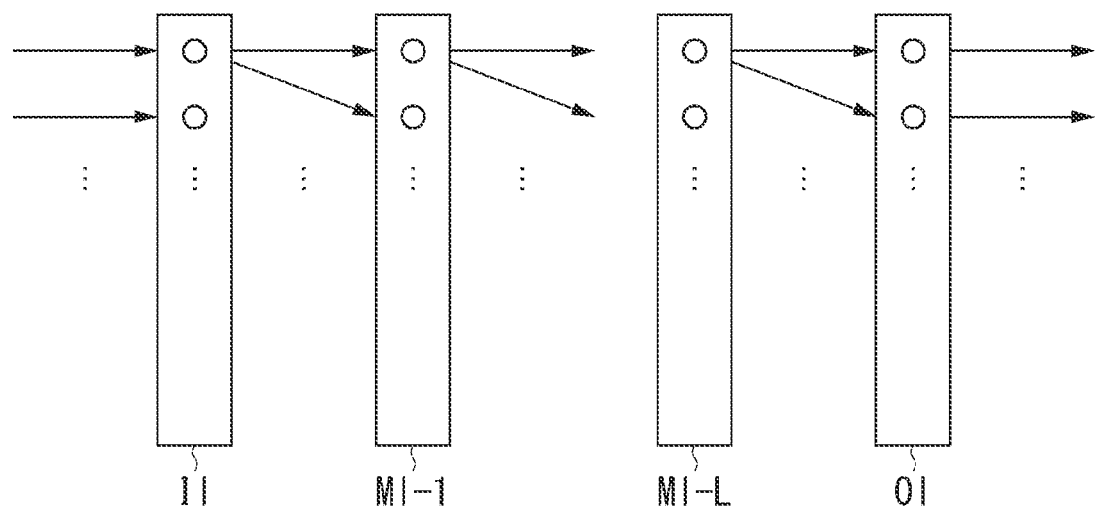
FIG. 7 is a diagram illustrating an example of the configuration of a machine learning model.

Next, an example of the machine learning model will be described. FIG. 7 is a diagram illustrating an example of the configuration of a convolutional neural network (CNN) that is one kind of neural network. The CNN is a representative example of a machine learning model used for so-called deep learning. The CNN includes one input layer, a plurality of middle layers (intermediate layers or hidden layers), and one output layer. The CNN illustrated in FIG. 5 includes an input layer II, L (here, L is an integer equal to or greater than 2) intermediate layers MI-1 to MI-L, and an output layer OI. Each of the layers includes a predetermined number of nodal points (nodes). The plurality of intermediate layers at least include one convolution layer and one pooling layer.

Each nodal point of the input layer II outputs an input value input thereto to at least one nodal point of the next layer. For example, in the prediction unit 120 and the parameter updating unit 430, individual sampled values within a predetermined period (for example, 10 to 100 ms) configuring a biomedical signal are input to nodal points corresponding to the sampled value.

Each nodal point of the output layer OI outputs an input value input from at least one nodal point of the previous layer to the outside. In the prediction unit 120 and the parameter updating unit 430, each element value (for example, an angle between parts) representing a motion is output from a nodal point corresponding to the element value.

The number of kernels is set in the convolution layer in advance. The number of kernels corresponds to the number of kernels used in processing (for example, calculation) for each input value. The number of kernels is commonly smaller than the number of input values. A kernel represents a processing unit for calculating one output value at one time. An output value calculated in a certain layer is used as an input value for the next layer. The kernel is also called a filter. A kernel size represents the number of input values used for performing processing once in a kernel. The kernel size is commonly an integer equal to or greater than 2.

The convolution layer is a layer that calculates a corrected value by calculating a convolved value by performing a convolution operation on input values input to a plurality of nodal points from a previous layer for each kernel and adding the calculated convolved value and a bias value. The convolution layer calculates a function value of a predetermined activation function for the calculated corrected value and outputs the calculated output value to the next layer. One or a plurality of input values are input to each nodal point of the convolution layer from a previous layer, and an independent convolution coefficient is used for each input value for calculating a convolved value at each nodal point. The convolution coefficient, the bias value, and the parameter of the activation function become a part of model parameters of one set.

For example, as the activation function, a rectified linear unit, a sigmoid function, or the like can be used. The rectified linear unit is a function for determining a threshold as an output value for an input value equal to or smaller than the predetermined threshold (for example, 0) and outputting an input value exceeding the predetermined threshold as it is. Thus, this threshold becomes a part of model parameters of one set. In the convolution layer, requirement/non-requirement of reference to an input value from a nodal point of the previous layer and requirement/non-requirement of output of an output value to a nodal point of the next layer become a part of model parameters of one set as well.

A pooling layer is a layer having a nodal point that determines one representative value among input values input from a plurality of nodal points of the previous layer and outputs the determined representative value to the next layer as an output value. As the representative value, for example, a value statistically representing a plurality of input values such as a maximum value, a mean value, or a most frequent number is used. In the pooling layer, a stride is set in advance. The stride represents a range of nodal points, which are adjacent to each other, of the previous layer to which an input value for one nodal point is referred. For this reason, the pooling layer can be regarded as a layer that contracts (down-sampling) input values from the previous layer into a lower dimension and provides an output value for the next layer.

Figure 11:
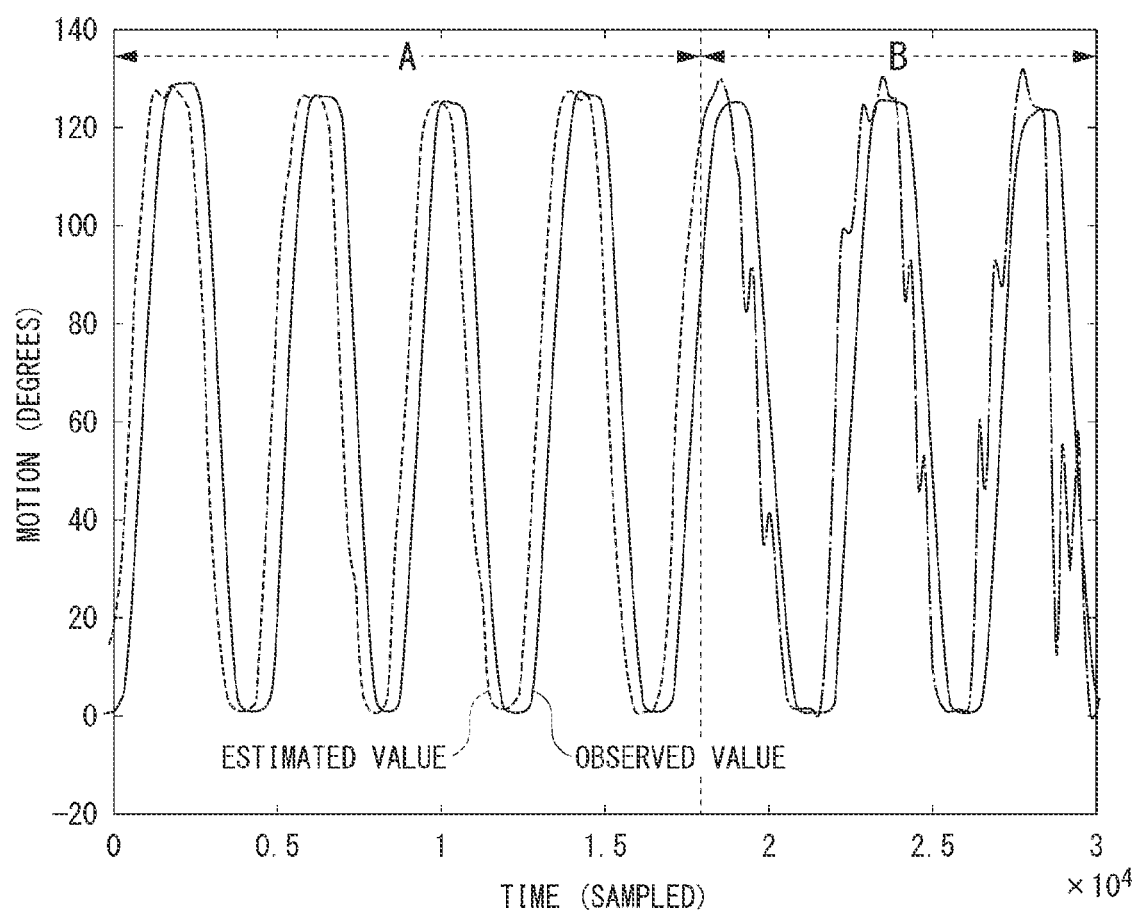
FIG. 11 is a diagram illustrating an example of estimation of an operator motion.

Next, an example of estimation of an operator motion using a machine learning model will be described. FIG. 11 is a diagram illustrating an example of estimation of the operator motion. In FIG. 11, the vertical axis and the horizontal axis respectively represent the motion and the time. A section A represents an estimated value of a motion estimated using the machine learning model on the basis of a biomedical signal used for model learning and an observed value of the motion. The estimated value takes a value that is approximately the same as the observed value. The estimated value leads the observed value by a time interval corresponding to the delay time $\Delta T_5$ (EMD). This represents that a motion at a prediction time that is a time after elapse of a prediction time interval corresponding to the delay time from the present is predicted. The reason for this is that synchronization with a motion set as output information is taken by adding a delay corresponding to a prediction time interval to a biomedical signal set as input information for a machine learning model in model learning. A section B represents an estimated value acquired using the machine learning model on the basis of a biomedical signal that has not been used for model learning and an observed value of the motion. Although error is added to the estimated value, the estimated value has a trend of changing in accordance with the elapse of time similar to the observed value. Although the estimated value leads the observed value by a time interval corresponding to a delay time, a period and an amplitude thereof are similar to those of the observed value.

In other words, FIG. 11 illustrates that a predicted value of a motion is acquired at a time that leads a prediction time, at which the motion based on a detected biomedical signal is acquired, by a time interval corresponding to the delay time $\Delta T_5$. By adjusting a prediction time interval in the range of the delay time $\Delta T_5$ in the embodiment described above, the prediction unit 120 can adjust a timing for controlling the motion of the robot 20 on the basis of the predicted value of the motion. More specifically, the prediction unit 120 may delay a motion signal (leading by the delay time $\Delta T_5$) acquired using the machine learning model described above for an input detection signal by a time corresponding to a time difference of the prediction time interval from the delay time $\Delta T_5$ and output the delayed motion signal to the control unit 210.

In the description presented above, although a case in which the EMG is used as a biomedical signal has been described as an example, the biomedical signal is not limited thereto. A biomedical signal that has a correlation with a motion of a human body and generated before the motion can be applied as the biomedical signal. As such a biomedical signal, for example, an electroencephalograph (EEG) can be used. In such a case, the detection unit 110 may be configured as a brain machine interface (BMI) used for noninvasively detecting an electroencephalograph. The BMI includes an electrode on the scalp used for detecting a change in the electric potential generated in accordance with an action of the brain. The electrode on the scalp may be installed in the head-mounted display. The electrode on the scalp may be installed at a position in contact with the scalp of an operator when the operator wears the head-mounted display.

As described above, each of the operation systems S1a, S1b, S1c, and S1d according to the embodiments described above includes: a prediction unit 120 configured to determine a predicted value of a motion of an operator at a prediction time that is a time after elapse of a prediction time interval from the present using a predetermined machine learning model from a biomedical signal of the operator; a control unit 210 configured to control a motion of a robot 20 on the basis of the predicted value; and a prediction time setting unit 170 configured to determine the prediction time interval on the basis of a delay time from a current value of the motion of the operator to the motion of the robot 20.

According to this configuration, the motion of the robot 20 is controlled on the basis of the predicted value of the motion of the operator at a prediction time that is a time after elapse of a prediction time interval determined on the basis of a delay time from the motion of the operator to the motion of the robot 20. Since the time of the motion of the robot 20 that is a control target can be adjusted in accordance with variations in the delay time, the variations in the delay time can be decreased or resolved. For this reason, the operability of the robot 20 can be improved.

The prediction time setting unit 170 may detect the delay time using the current value of the motion of the operator and an image representing a motion environment of the robot 20.

According to this configuration, the motion of the robot 20 is controlled on the basis of a delay time from a motion of the operator to a time when reflection of the motion in the motion of the robot 20 is transferred to the operator. Since control based on the delay that can be actually sensed by the operator is performed, the operability of the robot 20 can be improved.

The operation systems S1a, S1b, S1c, and S1d may include an imaging unit 30 configured to capture an image representing a motion environment of the robot.

According to this configuration, even when the operator is present at a place isolated from the robot 20, the operator can control the motion while visually recognizing the motion environment of the robot 20.

The prediction time setting unit 170 may detect a transmission delay relating to transmission from the prediction unit 120 to the control unit 210 and transmission from the imaging unit 30 to the prediction time setting unit 170 and determine the prediction time interval on the basis of the detected transmission delay.

According to this configuration, the motion of the robot 20 is controlled on the basis of the transmission delay relating to the transmission from the prediction unit 120 to the control unit 210 and the transmission from the imaging unit 30 to the prediction time setting unit 170. By compensating for the transmission delay that may remarkably vary in accordance with a communication environment, traffic, and the like, the operability of the robot 20 can be improved.

The prediction time setting unit 170 may cause a display unit 140 to display a setting screen of the prediction time interval and set the prediction time interval on the basis of an operation signal.

According to this configuration, the operator can arbitrarily set the prediction time interval. For this reason, the motion of the robot 20 can be controlled on the basis of a prediction time interval according to the preference of the operator and operation details.

The operation device 10d may include the estimation unit 150 configured to estimate a second motion of the operator on the basis of at least an image representing a motion environment of the robot and a motion signal representing the motion of the operator. The control unit 210 may control the motion of the robot 20 on the basis of the second motion.

According to this configuration, a motion intended by the operator is estimated as a second motion from the motion of the operator and the motion environment of the robot 20. By supplementing the operation for the robot 20 with the second motion, the intention of the operator is reflected in the motion of the robot 20. For this reason, the operability of the robot 20 is further improved.

Each of the operation devices 10a, 10b, 10c, and 10d may include the model learning unit 40 configured to determine a parameter of the machine learning model such that a difference between the predicted value of the motion of the operator determined using the machine learning model from the biomedical signal delayed by a delay time from the biomedical signal to the motion of the operator and an actually-measured value of the motion of the operator is further decreased.

According to this configuration, at a time leading the prediction time, at which a motion based on a detected biomedical signal is acquired, by a time corresponding to the delay time, a predicted value of the motion can be acquired. For this reason, a timing for controlling the motion of the robot 20 can be adjusted on the basis of the prediction value of the motion in the range of the delay time.

While the embodiments of the present invention have been described with reference to the drawings, specific configurations are not limited to those described above, and various design changes and the like can be made in a range not departing from the concept of the present invention.

For example, in the operation systems S1a, S1b, S1c, and S1d, one or both of the imaging unit 30 and the display unit 140 may be omitted. The transmission path $C_p$ may not include a communication network. Also in a case in which such a configuration is employed, an operator is able to relatively approach the robot 20 and see the motion environment of the robot 20, the configuration can be allowed.

Instead of each of the operation devices 10a, 10b, 10c, and 10d including the control unit 210, the control unit 210 may be omitted in the robot 20.

In a case in which the prediction unit 120 is connected to the detection unit 110 in a wired or wireless manner to be able to transmit various kinds of data thereto, the detection unit 110 may be omitted in each of the operation devices 10a, 10b, 10c, and 10d.

Each of the operation devices 10a, 10b, 10c, and 10d may include the model learning unit 40.

Each of the operation devices 10a, 10b, 10c, and 10d may not necessarily be configured to be able to be worn by a human body. For example, the operation devices 10a, 10b, 10c, and 10d may be a stationary type.

Figure 8:
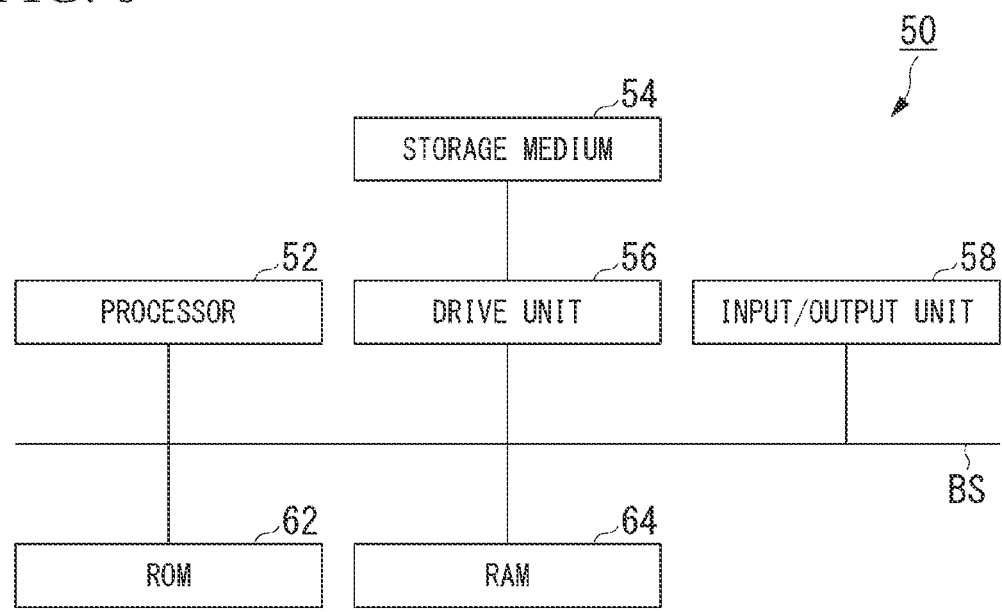
FIG. 8 is a diagram illustrating an example of the configuration of hardware.

The devices described above (for example, the operation devices 10a, 10b, 10c, and 10d, the robot 20, and the model learning device) may be realized by hardware including dedicated members or may be configured as a computer including general-purpose members. A computer 50 illustrated in FIG. 8 is configured to include a processor 52, a drive unit 56, an input/output unit 58, a ROM 62, and a RAM 64.

The processor 52 controls processes for exhibiting functions of individual devices and functions of units configuring the devices. The processor 52, for example, is a central processing unit (CPU).

In the drive unit 56, a storage medium 54 may be fixed or may be detachably attached. The drive unit 56 reads various kinds of data stored in the storage medium 54 or stores various kinds of data in the storage medium 54. The drive unit 56, for example, is a semiconductor drive (solid state drive (SSD)) or a hard disk drive (HDD). For example, the storage medium 54 is a non-volatile memory such as a flash memory or a hard disk.

The input/output unit 58 inputs/outputs various kinds of data to/from other devices in a wired or wireless manner. The input/output unit 58 may be connected to other devices through a communication network to be able to input or output various kinds of data. The input/output unit 58, for example, may be one of an input/output interface, a communication interface, and the like or any combination of such interfaces.

The read only memory (ROM) 62 is a storage medium that perpetually stores a program in which commands for directing various processes performed by units of individual devices are described, various kinds of data such as parameters used for the execution thereof, and various kinds of data acquired by the units. In description here, execution of a process directed using commands described in a program may be referred to as "the program being executed", "execution of the program" or the like.

The random access memory (RAM) 64 is a storage medium that is mainly used as a work area of the processor 52. The processor 52 records a program and parameters stored in the ROM 62 in the RAM 64 in accordance with activation thereof. Then, the processor 52 temporarily records a calculation result acquired through the execution thereof, acquired data, and the like in the RAM 64.

Each of the devices descried above may internally include a computer system. For example, the processor 52 described above may be a constituent element of the computer system. The procedure of each process described above is stored in a computer-readable storage medium in the form of a program, and, a computer reads and executes this program, thereby performing such a process. The computer system described here includes software such as an operation system (OS), a device driver, and a utility program and hardware such as peripherals. The hardware illustrated in FIG. 6 is an example of such hardware. The "computer-readable storage medium" represents a portable medium such as a magnetic disk, a magneto-optical disk, a ROM, a RAM, or a semiconductor memory and a storage device such as a hard disk built into the computer system. In addition, the computer-readable storage medium may include a medium that dynamically stores a program for a short time such as a communication line used in a case in which a program is transmitted using a network such as the Internet or a communication circuit line such as a telephone line and a medium storing the program for a predetermined time such as an internal volatile memory of a computer system serving as a server or a client in such a case. Furthermore, the program described above may be a program used for realizing a part of the function described above, and the program may be a program realizing the function described above by being combined with a program that has already been recorded in the computer system, a so-called a differential file (differential program).

Some or all of the devices described above may be realized as an integrated circuit such as a large scale integration (LSI). Each functional block of the devices described above may be individually configured as a processor, or some or all of the functional blocks may be integrated and configured as a processor. In addition, a technique used for configuring the integrated circuit is not limited to the LSI, and each function may be realized by a dedicated circuit or a general-purpose processor. Furthermore, in a case in which a technology of configuring an integrated circuit replacing the LSI emerges in accordance with the progress of semiconductor technologies, an integrated circuit using such a technology may be used.

What is claimed is:
1. An operation system comprising:
a processor configured to execute computer-executable components stored on a memory, the computer-executable components comprising:
a prediction unit configured to determine a predicted value of a first motion of an operator at a prediction time that is a time after elapse of a prediction time interval from a present time using a predetermined machine learning model from a biomedical signal of the operator;

a control unit configured to control a motion of a robot based on the predicted value;

a prediction time setting unit configured to determine the prediction time interval based on a delay time from a current value of the first motion of the operator to the motion of the robot;

an imaging unit configured to capture an image representing a motion environment of the robot; and an estimation unit configured to estimate a second motion of the operator based at least on the image representing the motion environment of the robot and a motion signal representing the first motion of the operator, wherein the prediction time setting unit detects the delay time using the current value of the first motion and the image representing the motion environment of the robot, the control unit controls the motion of the robot further based on the second motion, and the second motion includes:
- a motion of which a possibility of being intended by the operator is higher than those of other motions under the motion environment of the robot represented in the image;
- a motion that is more delicate than a motion estimated by the prediction unit;
- a motion of an individual finger; and
- a fine adjustment of one or both of a position or a direction of a hand part.

2. The operation system according to claim 1, wherein the estimation unit estimates a motion of causing tip ends of individual fingers to face each other as the second motion in response to determining that image data representing a status in which an end effector of the robot enters an area neighboring to an object more than a size thereof and a motion signal representing start of motions of a plurality of fingers are input, and the estimation unit estimates a motion of the tip ends of the individual fingers moving backward as the second motion in response to determining that image data representing a status in which the end effector of the robot is gripping an object placed on a table and the motion signal representing the start of motions of the plurality of fingers are input.

3. The operation system according to claim 1, wherein the prediction time setting unit detects a transmission delay relating to transmission from the prediction unit to the control unit and transmission from the imaging unit to the prediction time setting unit and determines the prediction time interval on the basis of based on the transmission delay.

4. The operation system according to claim 1, wherein the prediction time setting unit causes a display unit to display a setting screen of the prediction time interval and sets the prediction time interval based on an operation signal.

5. The operation system according to claim 1, further comprising a model learning unit configured to determine a parameter of the machine learning model such that a difference between the predicted value of the first motion of the operator determined using the machine learning model from the biomedical signal delayed by a delay time from the biomedical signal to the first motion of the operator and a measured value of the motion of the operator is decreased.

6. An operation method used in an operation system, the operation method comprising:

determining a predicted value of a first motion of an operator at a prediction time that is a time after elapse of a prediction time interval from a present time using a predetermined machine learning model from a biomedical signal of the operator;

controlling a motion of a robot based on the predicted value;

determining the prediction time interval based on a delay time from a current value of the first motion of the operator to the motion of the robot;

capturing an image representing a motion environment of the robot; and estimating a second motion of the operator based at least on the image representing the motion environment of the robot and a motion signal representing the first motion of the operator, wherein the determining of the prediction time interval comprises detecting the delay time using the current value of the first motion and the image representing the motion environment of the robot, the controlling comprises controlling the motion of the robot further based on the second motion, and the second motion includes:
- a motion of which a possibility of being intended by the operator is higher than those of other motions under the motion environment of the robot represented in the image;
- a motion that is more delicate than an estimated motion;
- motions of individual fingers; and
- a fine adjustment of one or both of a position or a direction of a hand part.

* * * * *